US012693122B2

(12) United States Patent
Datar et al.

(10) Patent No.: US 12,693,122 B2
(45) Date of Patent: Jul. 28, 2026

(54) AUTOMATIC TRACKING SYSTEM DETECTION AND CONTROL

(71) Applicant: Deere & Company, Moline, IL (US)

(72) Inventors: Ashutosh Datar, Pune (IN); Amey G. Katti, Pune (IN)

(73) Assignee: Deere & Company, Moline, IL (US)

( * ) Notice: Subject to any disclaimer, the term of this patent is extended or adjusted under 35 U.S.C. 154(b) by 76 days.

(21) Appl. No.: 18/778,383

(22) Filed: Jul. 19, 2024

(65) Prior Publication Data

US 2026/0022943 A1     Jan. 22, 2026

(51) Int. Cl.
| | |
|---|---|
| *G01C 21/34* | (2006.01) |
| *B60W 10/20* | (2006.01) |
| *B60W 50/14* | (2020.01) |
| *H04W 4/024* | (2018.01) |

(52) U.S. Cl.
CPC ......... *G01C 21/3407* (2013.01); *B60W 10/20* (2013.01); *B60W 50/14* (2013.01); *H04W 4/024* (2018.02); *B60W 2050/146* (2013.01); *B60W 2540/18* (2013.01)

(58) Field of Classification Search
CPC ... G01C 21/3407; B60W 10/20; B60W 50/14; B60W 2050/146; B60W 2540/18; H04W 4/024; A01B 79/005
See application file for complete search history.

(56) References Cited

U.S. PATENT DOCUMENTS

| | | | |
|---|---|---|---|
| 8,768,558 B2 | 7/2014 | Reeve et al. | |
| 9,802,620 B2 | 10/2017 | Munasinghe et al. | |
| 2006/0167600 A1 | 7/2006 | Nelson et al. | |
| 2016/0350985 A1 | 12/2016 | McQuade et al. | |
| 2024/0215473 A1* | 7/2024 | Okura ................... | G05D 1/248 |

FOREIGN PATENT DOCUMENTS

| | | |
|---|---|---|
| EP | 2437586 B1 | 8/2018 |

* cited by examiner

*Primary Examiner* — Abby Lin
*Assistant Examiner* — Renee LaRose
(74) *Attorney, Agent, or Firm* — Christopher J. Volkmann; KELLY, HOLT & CHRISTENSON PLLC

(57) ABSTRACT

An auto tracking performance system detects performance of an automatic tracking system on a work machine. The auto tracking performance system generates an output indicative of the detected performance. A control signal generator generates a control signal to control a controllable subsystem based on the detected performance.

20 Claims, 16 Drawing Sheets

AUTOMATIC TRACKING SYSTEM DETECTION AND CONTROL

FIELD OF THE DESCRIPTION

The present description relates to an automatic tracking system on a work machine. More specifically, the present description relates to detecting performance of an automatic tracking system and generating a control output based upon the detected performance.

BACKGROUND

There are a wide variety of different types of work machines. Some such work machines include agricultural work machines, such as harvesters, tractors, planting machines, and other work machines.

It is not uncommon for such work machines to include automatic tracking systems. An automatic tracking system receives a guidance line from a path planning system. The guidance line identifies a track that the work machine is to follow through a field or other worksite. The automatic tracking system generates control signals to control a controllable subsystem (such as a steering subsystem, a propulsion subsystem, etc.) in order to automatically follow the track through the field or other worksite.

The discussion above is merely provided for general background information and is not intended to be used as an aid in determining the scope of the claimed subject matter.

SUMMARY

An auto tracking performance system detects performance of an automatic tracking system on a work machine. The auto tracking performance system generates an output indicative of the detected performance. A control signal generator generates a control signal to control a controllable subsystem based on the detected performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figures 1A, 1B, 1C:
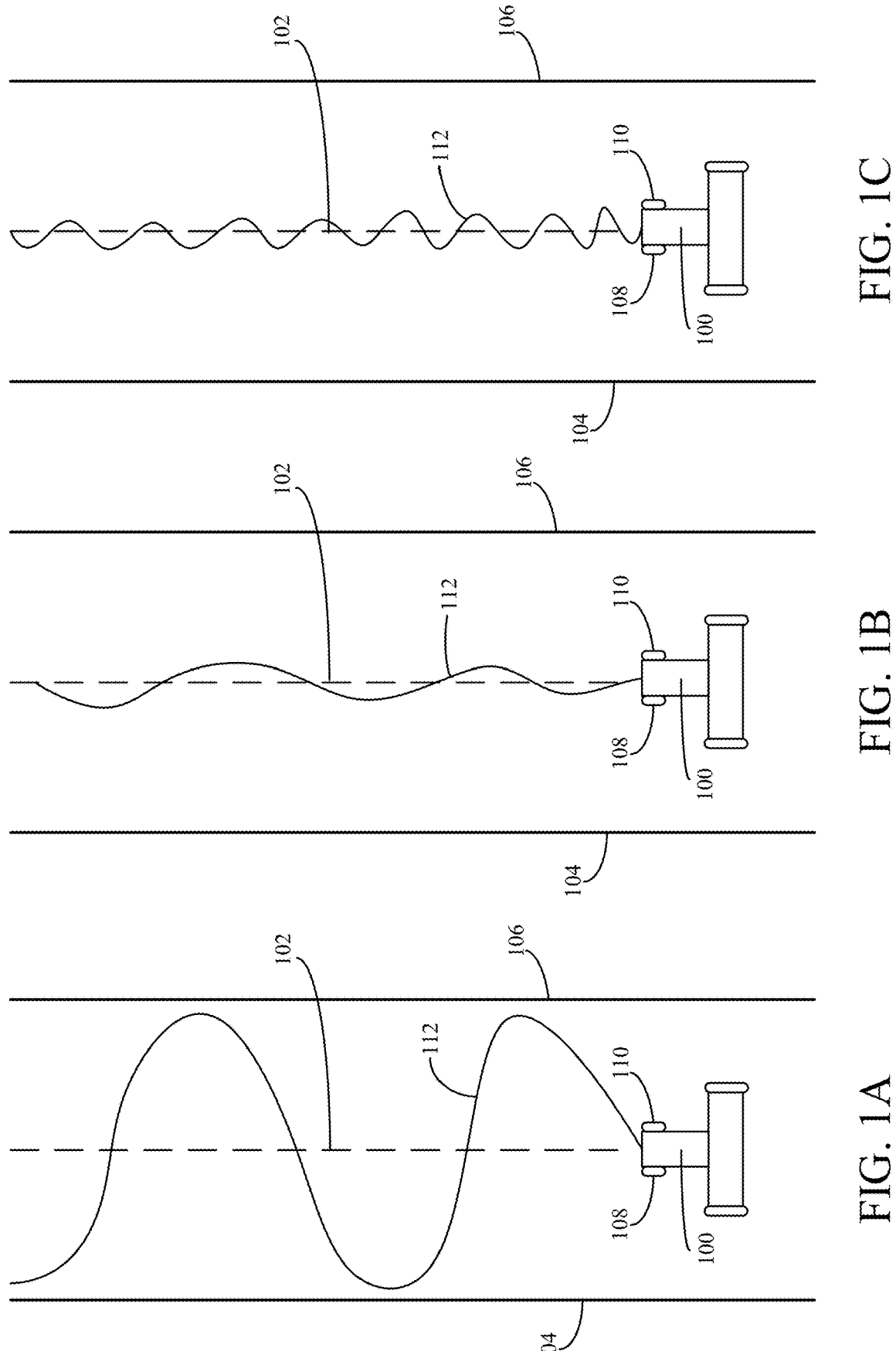
FIGS. 1A, 1B, and 1C are pictorial illustrations of an agricultural vehicle following a track.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

As discussed above, it is not uncommon for an agricultural work machine to have an automatic tracking system that receives a guidance line or navigation track (hereinafter referred to as a guidance line) from a path planning system. The guidance line identifies a path or track through the field that the agricultural work machine is to follow. An automatic tracking system may be a navigation system that generates control signals to control a propulsion subsystem and a steering subsystem on the agricultural work machine in order to follow the track. The automatic tracking system receives a position signal from a position sensor (such as a global navigation satellite system (GNSS) receiver) and compares the position and heading of the work machine to the location of the track in the field and generates the control signals to control the controllable subsystems in order to follow the track.

In one example, the steering subsystem includes an actuator that is actuated to change the heading of the work machine. For instance, the actuator may be a hydraulic actuator that is actuated to change the steering angle of a set of steerable wheels on the agricultural work machine. In another example, the actuator may be configured to control tracks or other ground-engaging elements in order to change the heading of the agricultural work machine in other ways (such as using skid steering, all wheel steering, etc.). A sensor is configured to sense a variable indicative of the control of the actuator. For instance, the sensor may be a wheel angle sensor that senses the angle of the wheels relative to a frame of the agricultural work machine. The sensor may also be an actuator sensor that senses the degree to which the steering actuator has been actuated. The sensor may be another sensor that senses a variable indicative of the heading of the agricultural work machine, or another variable indicative of the extent to which a steering actuator is actuated.

Based upon the current position and heading of the agricultural work machine and based upon the location of the guidance line, the automatic tracking system generates an output indicative of a commanded steering angle that is computed to move the agricultural work machine closer to the guidance line.

The speed with which the steering subsystem reacts to the commanded steering angle affects the performance of the agricultural work machine. If the steering subsystem does not react quickly enough, this can lead to sloppy track following performance. However, if the steering subsystem reacts too quickly, this can lead to steering performance that is jerky and uncomfortable for a human operator, and that may increase wear on various components in the agricultural work machine.

The reaction of the steering subsystem to the commanded steering angle may vary for a variety of reasons. For instance, the actuator may wear over its useful lifetime so that it no longer performs at a desired level of performance. Similarly, the sensor that senses the variable indicative of steering angle may also wear out or may malfunction.

One example of the present discussion thus describes a system that monitors the steering reaction performance of the automatic tracking system and the steering subsystem to determine how quickly the steering subsystem is reacting to commanded changes in the steering angle. Based upon the detected performance, a control signal is generated to control the agricultural work machine (such as to generate a display, a warning, or perform other control operations).

Further, the automatic tracking system not only generates command signals to follow a guidance line, but the automatic tracking system also performs track acquisition whereby the automatic tracking system identifies a next guidance line to follow and guides the agricultural work machine to acquire that track to follow. For instance, when the agricultural work machine reaches the end of a pass through a field, and performs a headland turn, the automatic tracking system must identify the next guidance line that the agricultural work machine will follow during the next subsequent pass through the field. The automatic tracking system then generates control signals to control the steering subsystem so that the agricultural work machine begins following the identified guidance line. The automatic tracking system is said to have "acquired" the track defined by the guidance line when the agricultural work machine is following the track or within a desired lateral offset value. The time and/or travel distance required for the agricultural work machine to acquire the track or guidance line is indicative of the performance of the automatic tracking system in performing track acquisition. The track acquisition performance may be indicative of whether the automatic tracking system is performing properly. If track acquisition is not being achieved within a desired time or distance, this may indicate that the steering subsystem or the automatic tracking subsystem, and/or other items on the work machine are malfunctioning or are in need of maintenance or other service.

Therefore, according to one example, the present description describes a system that automatically detects the track acquisition performance of the automatic tracking system. A control signal is generated based on the track acquisition performance.

FIG. 1A is a pictorial illustration showing one example of an agricultural vehicle 100 attempting to follow a guidance line 102 through a field. A pair of lateral offsets 104 and 106, on either side of guidance line 102, define an acceptable offset within which agricultural work machine 100 can operate and still be following guidance line 102. In the example shown in FIG. 1, agricultural work machine 100 is a tractor with a set of ground-engaging elements 108-110 which are steerable wheels. An automatic tracking system (described elsewhere herein) acquires the guidance line 102 and generates control signals to control the angle of the steerable wheels 108, 110 to follow guidance line 102 within the lateral offsets 104 and 106.

In FIG. 1A, the agricultural work machine 100 is following a course indicated by line 112. It can be seen that line 112 varies widely within the lateral offsets 104 and 106, on opposite sides of guidance line 102. This can indicate that the automatic tracking system and/or the steering subsystem on tractor 100 is reacting relatively slowly in generating steering commands and/or reacting to the generated steering commands to follow guidance line 102.

FIG. 1B is a pictorial illustration that is similar to FIG. 1A, and similar items are similarly numbered. However, in FIG. 1B it can be seen that the automatic tracking system and/or the steering subsystem on tractor 100 is reacting more quickly to make corrections to the route 112 so that it more closely follows guidance line 102. FIG. 1C is similar to FIG. 1B, and similar items are similarly numbered. However, FIG. 1C shows that the automatic tracking system and/or the steering subsystem are reacting very quickly, thus generating a choppy or jerky route 112 that can lead to discomfort in the operator compartment of agricultural work machine 100 and can also lead to excess wear on various parts of agricultural work machine 100.

Figure 2C:
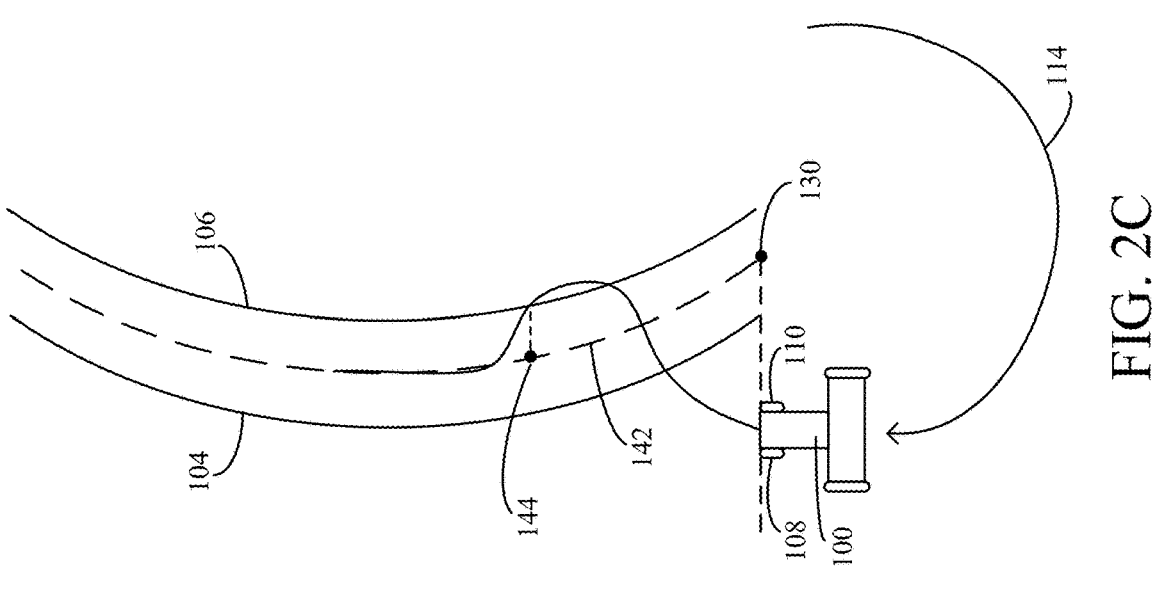
FIGS. 2A, 2B and 2C are pictorial illustrations showing an agricultural vehicle acquiring a track for automated track following.
Figure 2B:
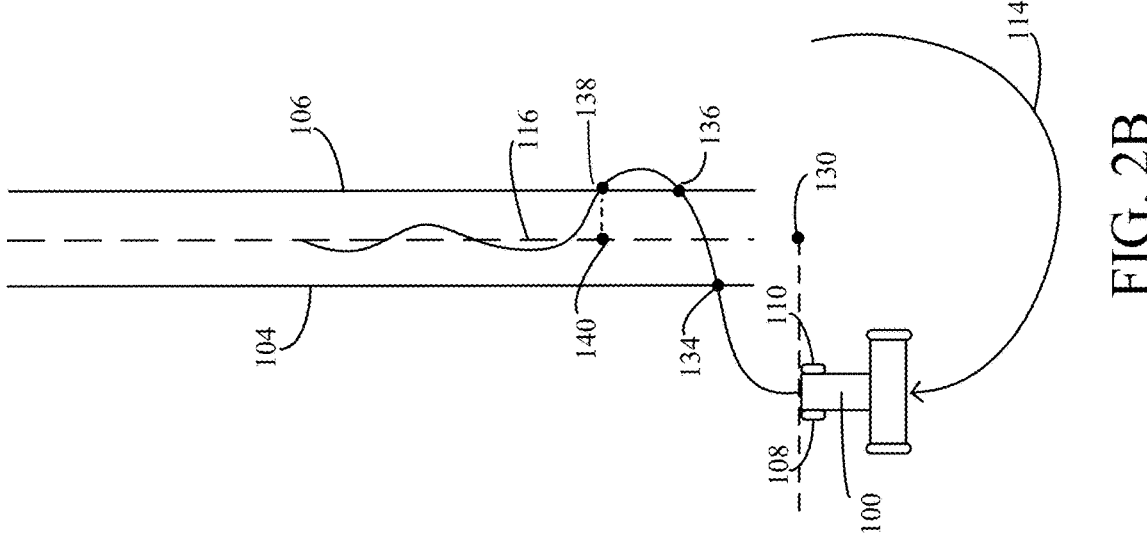
Figure 2A:
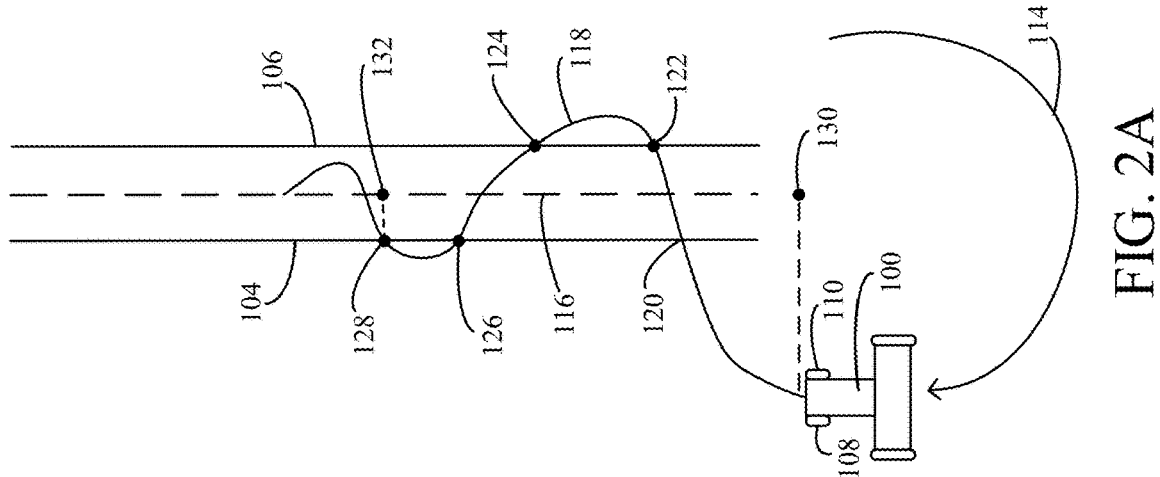

FIG. 2A is a pictorial illustration showing agricultural work machine 100 in the middle of a headland turn. In FIG. 2A, agricultural work machine 100 performs a headland turn 114 to traverse from a previous pass made along a previous guidance line to a subsequent pass that is to be made along a next guidance line 116. In the example shown in FIG. 2A, once the auto-tracking system on agricultural vehicle 100 selects the next guidance line 116, this indicates that the automatic tracking system is engaged and the engaged automatic tracking system begins to control the steerable wheels on agricultural work machine 100 to begin following that guidance line 116. In doing so, the automatic tracking system turns the wheels so that agricultural work machine 100 follows the route indicated by line 118.

In FIG. 2A, route 118 crosses the lateral offset 104 at point 120, and crosses lateral offset 106 at point 122 and again begins to turn agricultural work machine 100 back towards guidance line 116, crossing lateral offset 106 at point 124 and crossing lateral offset 104 at points 126 and 128 before acquiring guidance line 116 (e.g., by staying within lateral offsets 104 and 106 while making turns to following guidance line 116). Thus, the track acquisition distance (the distance along guidance line 116) that it takes agricultural work machine 100 to acquire guidance line 116, after the automatic tracking system is engaged extends from point 130 to point 132.

FIG. 2B is similar to FIG. 2A, and similar items are similarly numbered. However, in FIG. 2B, the agricultural work machine 100 is controlled to more quickly acquire guidance line 116. In the example shown in FIG. 2B, the automatic tracking system controls agricultural work machine 100 to move towards track 116, crossing lateral offset 104 at point 134, and then crossing lateral offset 106 at points 136 and 138 before acquiring guidance line 116. In that case, the acquisition distance is represented by the distance along guidance line 116 between points 130 and 140. Thus, the automatic tracking system performs better in acquiring guidance line 116 in FIG. 2B than it does in FIG. 2A because the acquisition distance is reduced in FIG. 2B relative to that in FIG. 2A.

FIG. 2C is similar to FIG. 2B and similar items are similarly numbered. However, in FIG. 2C it shows that the guidance line 142 that is to be acquired is curved instead of straight. The acquisition distance (the distance between when the automatic tracking system is engaged by having identified guidance line 142 as the next guidance line and when agricultural work machine 100 is following the identified guidance line 142 within the desired lateral offsets 104 and 106) is represented by the distance along guidance line 142 between points 130 and 144.

In the previous figures, the acquisition time may be detected along with, or instead of, the acquisition distance. The acquisition time is the elapsed time between when the automatic tracking system is engaged and when the automatic tracking system acquires the guidance line.

Figure 3:
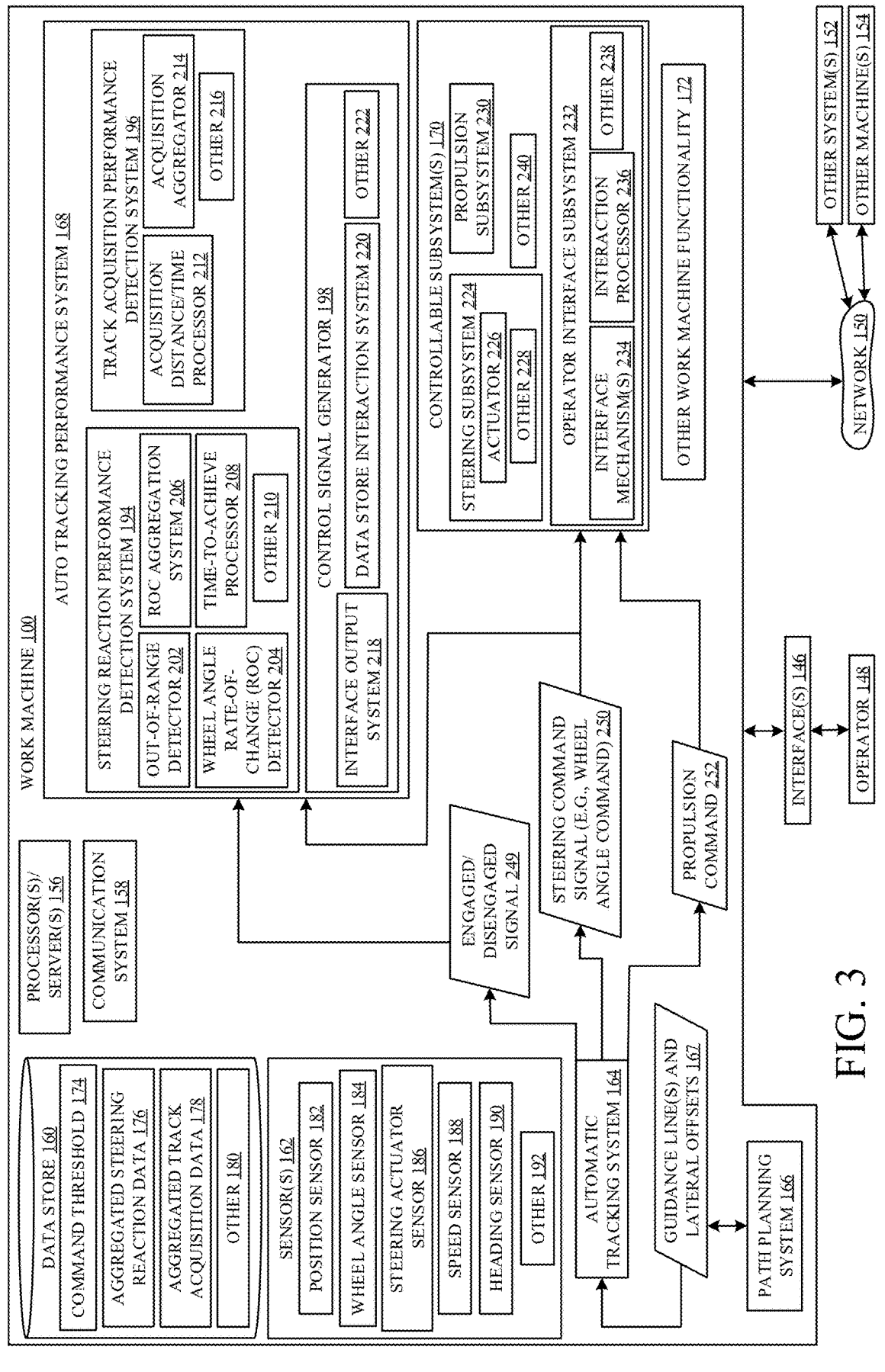
FIG. 3 is a block diagram of one example of a work machine in more detail.

FIG. 3 is a block diagram showing one example of work machine 100 in more detail. FIG. 3 shows that work machine 100 can generate one or more interfaces 146 for an operator 148. Operator 148 can interact with interfaces 146 to control and manipulate portions of work machine 100.

FIG. 3 also shows that, in one example, work machine 100 can communicate over network 150 with other systems 152 and/or other machines 154. Other systems 152 can be farm management systems, systems in a remote server environment, vendor systems, etc. Other machines 154 can include tender vehicles or other machines operating in the same field as work machine 100 or elsewhere. Network 150 can be a cellular network, a wide area network, a local area network, a near field communication network, a Wi-Fi or Bluetooth network, or any of a wide variety of different networks or combinations of networks.

FIG. 3 also shows that, in one example, work machine 100 includes one or more processors or servers 156, communication system 158, data store 160, one or more sensors 162, automatic tracking system 164, path planning system 166, auto tracking performance system 168, controllable subsystems 170, and any of a wide variety of other work machine functionality 172. Data store 160 can include a command threshold value 174, aggregated steering reaction data 176, aggregated track acquisition data 178, and any of a wide variety of other information 180. Sensors 162 can include position sensor 182, wheel angle sensor 184, steering actuator sensor 186, speed sensor 188, heading sensor 190, or other sensors 192. Auto tracking performance system 168 can include steering reaction performance detection system 194, track acquisition performance detection system 196, control signal generator 198, and other items 200. Steering reaction performance detection system 194 can include out-of-range detector 202, wheel angle rate-of-change (ROC) detector 204, ROC aggregation system 206, time-to-achieve processor 208, and other items 210. Track acquisition performance detection system 196 can include acquisition distance/time processor 212, acquisition aggregator 214, and other items 216. Control signal generator 198 can include interface output system 218, data store interaction system 220, and other items 222. Controllable subsystems 170 can include steering subsystem 224 (which, itself, includes steering actuator 226 and other items 228), propulsion subsystem 230, operator interface subsystem 232 (which can include interface mechanisms 234, interaction processor 236 and other items 238), and any of a wide variety of other controllable subsystems 240. Before describing the overall operation of work machine 100, a description of some of the items in work machine 100, and their operation, will first be provided.

Communication system 158 enables communication of the items on work machine 100 with one another, and can also facilitate communication over network 150. Therefore, communication system 158 can be a controller area network (CAN) bus and bus controller, a wide area network communication system, a local area network communication system, a Wi-Fi or Bluetooth communication system, a near field communication system, a cellular communication system, or any of a wide variety of other communication systems or combinations of systems.

Command threshold data 174 may be used to determine whether track acquisition performance is to be detected. For instance, if the commanded steering angle exceeds the command threshold 174 relative to a current steering angle, this may mean that the work machine 100 is performing a headland turn or other aggressive turn where steering reaction performance is not to be detected. Aggregated steering reaction data 176 may be averaged or other aggregated steering performance data generated by steering reaction performance detection system 194. Aggregated track acquisition data 178 may be averaged or otherwise aggregated data generated by track acquisition performance detection system 196.

Sensors 162 generate sensor signals indicative of sensed variables. Position sensor 182 may be a global navigation satellite system (GNSS) receiver or another sensor, such as a dead reckoning sensor, cellular triangulation sensor, or another sensor that generates an output indicative of the position of work machine 100 in a global or local coordinate system. Wheel angle sensor 184 is mounted on work machine 100 to sense the angle of wheels or other ground-engaging elements relative to the frame of work machine 100. Wheel angle sensor 184 may be a rotary sensor, such as a potentiometer or angle encoder, or another sensor. Wheel angle sensor 184 may indirectly sense the angle of the wheels based upon a commanded output, a voltage, or another signal level.

Steering actuator sensor 186 senses the position of a steering actuator 226. For instance, steering actuator 226 may be a hydraulic cylinder or another type of actuator that drives steering movement of the ground-engaging elements (such as the wheels 108, 110). Therefore, the extent to which the actuator is actuated (lengthened or shortened) correlates to the steering angle. The steering actuator sensor 186 may thus be a linear sensor, a Hall effect sensor, or another type of sensor that senses the degree to which steering actuator 226 is actuated. Other types of steering actuator sensors can be used as well.

Speed sensor 188 illustratively senses the ground speed of work machine 100. Therefore, speed sensor 188 may be a speedometer, a sensor that senses the speed of rotation of an axle, of a wheel, of a motor or motors driving a transmission, or another type of sensor. Similarly, speed sensor 188 may generate a speed signal based upon the outputs of other sensors. For instance, speed sensor 188 may receive signals from position sensor 182 and calculate the speed of work machine 100 based upon the change in position over time.

Heading sensor 190 is configured to sense the heading of work machine 100. Therefore, heading sensor 190 may be an inertial measurement unit, an accelerometer, an optical sensor with associated image processing functionality, or another sensor that can be used to sense the orientation and/or heading of work machine 100. Heading sensor 190 may also generate an output indicative of the heading of work machine 100 based upon the inputs from other sensors as well. For instance, heading sensor 190 may receive multiple inputs from position sensor 182 and compute the heading of work machine 100 based upon the change in position.

Path planning system 166 automatically generates a set of guidance lines 167 for automatic tracking system 164. Path planning system 166 may run algorithms that operate based on graph search techniques, such as the A-star algorithm or Dijkstra algorithm, or algorithms that operate based on heuristic intelligent search mechanisms, such as the genetic algorithm, ant colony algorithm, etc. The path planning system can operate based on a local obstacle-avoidance algorithm, such as a dynamic window approach algorithm, an artificial potential field method, or 8 the path planning system may run an algorithm based on artificial intelligence using a neural network, reinforcement learning, or sample-based algorithms, or any of a wide variety of other algorithms, such as planner-based algorithms, trajectory optimization for motion planning algorithms, constraint satisfaction problem-based algorithms, model predictive control systems, quadratic programming systems, or other systems or algorithms. The guidance lines 167 are illustratively geographically located on the field or worksite where work machine 100 is working, and define paths that work machine 100 is to follow in performing its operation. The guidance lines 167 may also include the lateral offsets 104 and 106, and may include other information as well.

Automatic tracking system 164 illustratively generates an engaged/disengaged signal 249. Signal 249 indicates that the automatic tracking system 164 is engaged once automatic tracking system 164 identifies the next guidance line 167 that it is to follow through a field. For instance, after making a headland turn, automatic tracking system 164 may automatically select a guidance line 167 that it will follow on the next pass through the field. Once that next guidance line 167 is identified, automatic tracking system 164 generates an engaged signal 249 indicating that automatic tracking system 164 is engaged and is attempting to acquire and follow a guidance line. Automatic tracking system 164 receives sensor inputs from sensors 162 to identify the location of work machine 100, and the heading of work machine 100, relative to the next selected guidance line 167. Based upon that location, automatic tracking system 164 automatically generates a steering command signal 250 and provides the steering command signal 250 to controllable subsystems 170 (such as steering subsystem 224) to command the steering actuator 226 to steer the work machine 100 in a desired way. In one example, steering command signal 250 comprises a wheel angle command signal that is provided to steering actuator 226 to steer the wheels to a desired steering angle. Automatic tracking system 164 can also generate a propulsion command signal 252 that can be provided to propulsion subsystem 230 to control the forward/backward direction and speed of work machine 100. Once automatic tracking system 164 is controlling the work machine to follow the selected guidance line 167 within the specified lateral offsets, then automatic tracking system 164 has acquired the guidance line 167 and continues to automatically control work machine 100 to follow the guidance line 167 within the lateral offsets. By "automatically" it is meant, in one example, that the process or function is carried out without further human involvement except, perhaps, to initiate or authorize the process or function.

As soon as the work machine 100 reaches the end of the pass defined by the guidance line 167, and is beginning a headland turn, automatic tracking system 164 may generate a disengaged signal 249 indicating that automatic tracking system 164 is not yet attempting to acquire and follow a specific guidance line.

Auto tracking performance system 168 detects the performance of automatic tracking system 164 in performing a number of different functions. Steering reaction performance detection system 194 detects how quickly steering subsystem 224 reacts to changes in the commanded steering angle from steering command 250. This provides an indication of whether steering actuator 226 or wheel angle sensor 184 (or steering actuator sensor 186) are malfunctioning, are wearing out, need maintenance, etc. Out-of-range detector 202 detects the difference between the current steering angle and the newly commanded steering angle commanded by steering signal 250. If the difference between the current steering angle and the commanded steering angle meets a threshold value, then steering performance will not be detected because the difference between the current and commanded steering angle is too large. This may indicate, for instance, that work machine 100 is performing a headland turn, or is otherwise turning aggressively so that steering performance need not be detected.

As an example, assume that out-of-range detector 202 calculates difference between the current and commanded steering angle and compares that against command threshold 174 which may be a threshold angle value. If the difference between the current and commanded steering angle meets the command threshold 174, then out-of-range detector 202 may generate an output indicating that the commanded steering angle is out of range for steering reaction performance detection. In another example, assume, that out-of-range detector 202 generates an output indicating that the steering reaction performance should be detected, then wheel angle rate-of-change (ROC) detector 204 calculates the rate at which steering actuator 226 changes the wheel angle (or other steering angle) on work machine 100. For instance, wheel angle ROC detector 204 may receive inputs from wheel angle sensor 184 or steering actuator sensor 186 over a plurality of different sample time periods. Wheel angle ROC detector 204 detects the change in wheel angle from one sample to the next and identifies the rate of change of the wheel angle over time. Wheel angle ROC detector 204 can calculate the rate of change in the wheel angle between each sample period and provide that information to ROC aggregation system 206.

ROC aggregation system 206 can aggregate the rate of change values output by wheel angle ROC detector 204 (such as by providing a moving average or performing other aggregation). Based upon the aggregated ROC value generated by ROC aggregation system 206, time-to-achieve processor 208 can calculate the time to achieve a commanded steering angle. For instance, by knowing the difference between the current steering angle (identified by wheel angle sensor 184 or steering actuator sensor 186) and the commanded steering angle (identified by steering command signal 250), and by knowing the rate at which actuator 226 is changing the steering angle, time-to-achieve processor 208 can generate an output indicative of how quickly steering subsystem 224 will reach the commanded steering angle identified by steering command signal 250. The time-to-achieve value can be output from processor 208 to control signal generator 198.

Interface output system 218 can generate a control signal to control operator interface subsystem 232 to generate an interface 146 showing information indicative of the time-to-achieve value. Data store interaction system 220 can generate a control signal to control data store 160 to control the time-to-achieve output by processor 208 as part of the aggregated steering reaction data 176. Other items 222 in control signal generator 198 can generate other control signals to control the steering subsystem 224, the propulsion subsystem 230, or other items 240 based upon the time-to-achieve value output by processor 208. As one example, where the time-to-achieve value output by processor 208 indicates that the time it will take steering subsystem 224 to achieve the commanded steering angle is above a threshold value, then other control signal generator 222 can generate an output to propulsion subsystem 230 to slow work machine 100 down so that the commanded steering angle can be achieved before work machine 100 travels too far. This is just one example of how control signals can be generated based on the time-to-achieve value output by processor 208. Also, interface output system 218 can generate an interface element for display to operator 148 indicating whether the time-to-achieve exceeds a threshold time value (which may indicate that steering subsystem 224 is performing sub optimally, needs maintenance, etc.). Some examples of a display element are described below with respect to FIGS. 5A-5C.

Track acquisition performance detection system 196 detects the performance of automatic tracking system 164 in acquiring a track (or guidance line) once automatic tracking system 164 is engaged. Acquisition distance/time processor 212 computes the distance that work machine 100 travels along the guidance line 167 between the time when automatic tracking system 164 is engaged (e.g., when it has identified a guidance line 167 to follow), and when that guidance line is acquired (when work machine 100 is staying within the lateral offsets 104 and 106 relative to the guidance line 167). Acquisition distance/time processor 212 can also compute the time and/or distance required for work machine 100 to acquire the guidance line 167 as well. Acquisition aggregator 214 aggregates acquisition times and/or distances across multiple different tracks. Data store interaction system 220 can control data store 160 to store the aggregated track acquisition data 178. The aggregated track acquisition data 178 may be used to identify portions of the field where traction is less desirable (such as where the field is muddy, where the terrain is uneven, etc.). This may be identified, for instance, where the normal track acquisition time for most tracks has a first value while the track acquisition time for a subset of tracks has a larger value. In that case, when work machine 100 approaches the area where the track acquisition time is larger, the work machine 100 can be slowed down so that the track is acquired before work machine 100 travels beyond a desirable distance. Similarly, by aggregating the track acquisition data, that data can be used to determine whether automatic tracking system 164 should be tuned or calibrated or modified in another way to achieve better track acquisition performance. By aggregated (such as averaging the data over multiple tracks), the aggregated track acquisition data will be representative of the operation of automatic tracking system 164, without respect to the terrain over which work machine 100 is traveling. For instance, by averaging the track acquisition data over a sufficient number of guidance lines, then the aggregated data will be less affected by guidance lines located in areas where the traction is sub optimum or otherwise problematic, and be more reflective of the operation and performance of automatic tracking system 164 in acquiring a guidance line.

As discussed elsewhere herein, steering subsystem 224 can include a steering actuator 226 that is actuated to change the heading of work machine 100. Actuator 226 may thus be an actuator that changes the steering angle of steerable wheels, that changes the steering angle corresponding to skid steer operation, or that changes the steering angle in other ways. Propulsion subsystem 230 can be an internal combustion engine, an electric motor, or another power source. The power source can be coupled to ground-engaging elements, such as wheels or tracks, through a transmission, through a direct drive system, or in other ways.

Operator interface subsystem 232 can include interface mechanisms 234 and interaction processor 236 among other things 238. The interface mechanisms 234 can include a steering wheel, joysticks, pedals, buttons, linkages, or other items. The interface mechanisms 234 can also include a display screen, lights, speakers, or other items that provide audio, visual, and/or haptic outputs to operator 148 and receive inputs from operator 148. Where the operator interface mechanisms 234 include a display screen, then the operator interface mechanisms can also include icons, links, buttons or other operator actuatable mechanisms that can be actuated on interfaces 146 displayed to operator 148. Interaction processor 236 can detect operator interaction with interfaces 146 and/or interface mechanisms 234 and generate outputs indicative of those interactions. Work machine 100 can be controlled based upon such operator inputs.

Figure 4A:
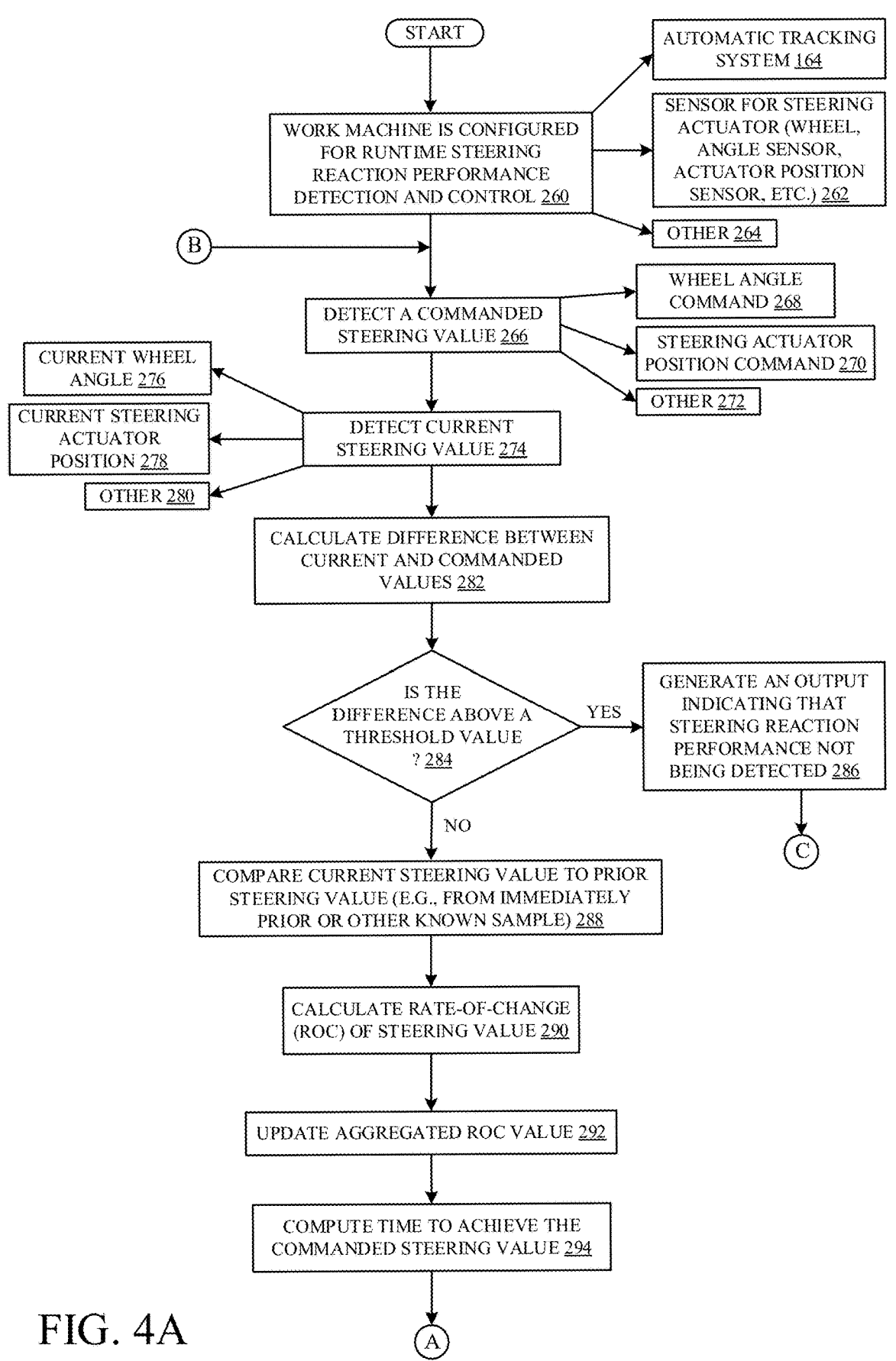
FIGS. 4A and 4B illustrate a flow diagram showing one example of the operation of an auto tracking performance system in detecting steering reaction performance.
Figure 4B:
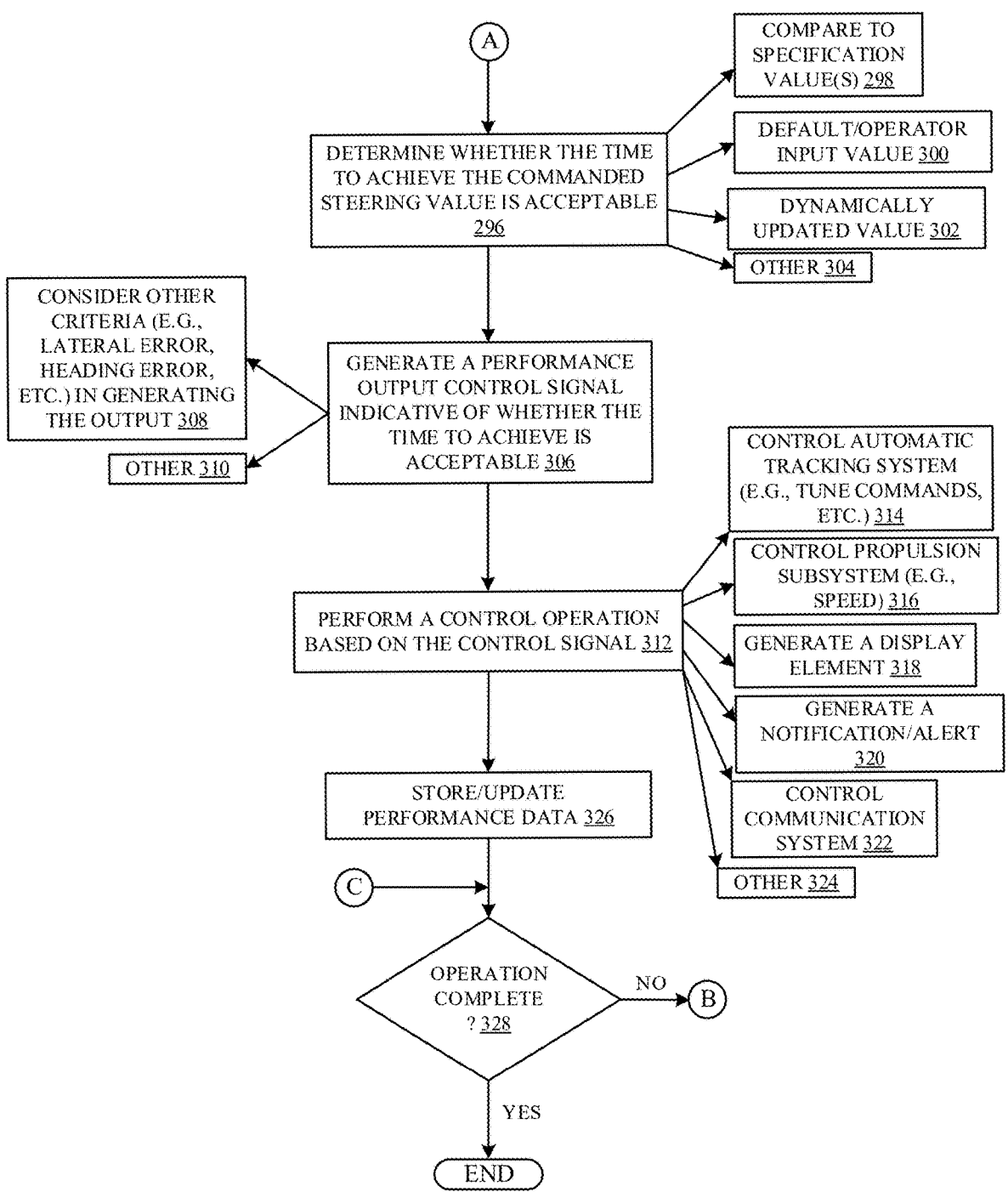

FIGS. 4A and 4B (collectively referred to herein as FIG. 4) show a flow diagram, illustrating one example of the operation of steering reaction performance detection system 194. It is first assumed that work machine 100 is configured for runtime steering reaction performance detection and control, as indicated by block 260 in the flow diagram of FIG. 4. Thus, work machine has an automatic tracking system 164 that is configured to automatically track a guidance line or other path generated by path planning system 166. Work machine 100 also has a steering actuator sensor 186 or wheel angle sensor 184 that provides an output indicative of the steering angle of work machine 100, as indicated by block 262 in the flow diagram of FIG. 4. Work machine 100 may have other items as well, as indicated by block 264.

Out-of-range detector 202 detects a commanded steering value, as indicated by block 266, which may be a commanded wheel angle 268, or a commanded actuator position for steering actuator 226, as indicated by block 270. The commanded steering value indicative of the steering angle of work machine 100 can be provided in other ways and detected by rate-of-change detector 202 in other ways as well, as indicated by block 272. Rate-of-change detector 202 also detects the current steering value (e.g., the current wheel angle or steering actuator angle as output by one or both of sensors 184, 186. Detecting the current steering value is indicated by block 274 in the flow diagram of FIG. 4. Detecting the current wheel angle output from wheel angle sensor 184 is indicated by block 276, and detecting the current steering actuator position output by steering actuator sensor 186 is indicated by block 278. The current steering value can be detected in other ways as well, as indicated by block 280.

Out-of-range detector 202 then calculates the difference between the current and commanded steering values and determines whether that difference meets a command threshold value 174. Calculating the difference between the current and commanded values is indicated by block 282 and determining whether the difference meets a command threshold value 174 is indicated by block 284. If, at block 284, it is determined that the difference between the current steering angle and the commanded steering angle exceeds or meets the command threshold value 174, then this indicates that work machine 100 is performing an aggressive turn (such as a headland turn or another turn) where the steering reaction performance will not be detected. In that case, out-of-range detector 202 provides an output to control signal generator 198 so that control signal generator 198 generates an output indicating that steering performance is not being detected, as indicated by block 286. The control signal can generate an output for operator 148, can control data store 160, or perform other control operations.

If, at block 284, it is determined that the difference between the commanded steering value and the current steering value does not meet or exceed command threshold 174, then wheel angle rate-of-change (ROC) detector 204 compares the current steering angle value to the steering angle value from a prior sample time period, as indicated by block 288. By way of example, the steering angle value may be sampled (from wheel angle sensor 184 or steering actuator sensor 186) every 10 milliseconds. In that case, wheel angle ROC detector 204 compares the current steering angle to the steering angle that was detected in the previous sample (10 milliseconds earlier). Based on the change in steering angle over the sample time period, wheel angle ROC detector 204 computes the rate-of-change of the steering angle over that 10 millisecond time period, as indicated by block 290. The rate-of-change is output to ROC aggregation system 206 which adds the new rate of change value just provided by wheel angle ROC detector 204 to an aggregated value. For example, ROC aggregation system 206 may compute a moving average that averages the last N wheel angle ROC values generated by wheel angle ROC detector 204. Updating an aggregated rate-of-change value is indicated by block 292 in the flow diagram of FIG. 4.

In one example, wheel angle ROC detector 204 detects the rate-of-change of the wheel angle or steering angle in degrees per second using Equation 1 below:

$$ROC = \frac{|\text{current wheel angle}| - |\text{wheel angle from prior sample}|}{\text{sample time period}}$$

Updating the aggregated ROC value can be performed by calculating a moving average of ROC values (computed as in Eq. 1) over, for instance, the last 20 samples.

Time-to-achieve processor 208 then computes the time-to-achieve the commanded steering angle value based upon the current steering angle value, the commanded steering angle value, and the aggregated rate-of-change value. Computing the time-to-achieve the commanded steering angle value is indicated by block 294 in the flow diagram of FIG. 4. In one example, time-to-achieve processor 208 computes the time-to-achieve the commanded steering angle value as illustrated in Equation 2 below:

$$TOA = \frac{|\text{commanded wheel angle}| - |\text{current wheel angle}|}{\text{Aggregated } ROC}$$

where, TOA=time-to-achieve the commanded wheel angle.

Time-to-achieve processor 208 then determines whether the TOA is acceptable (e.g., whether the steering subsystem 224 is responding to the commanded steering angle in an acceptable manner), as indicated by block 296 in the flow diagram of FIG. 4. For instance, time-to-achieve processor 208 can compare the TOA to an upper and lower specification value to determine whether work machine 100 is reacting too quickly or too slowly to the commanded steering angle. Comparing the TOA to upper and lower specification values is indicated by block 298 in the flow diagram of FIG. 4. The TOA can be compared to a default or operator input value, as indicated by block 300, or to a dynamically updated value as indicated by block 302. Determining whether the TOA is acceptable can be done in other ways as well, as indicated by block 304. The outputs from any or all of the detectors 202, 204, system 206, and/or processor 208 can be provided to control signal generator 198 to generate a performance output control signal indicative of whether the automatic tracking system 164 and steering subsystem 224 are performing in an acceptable way, as indicated by block 306.

Interface output system 248 can generate an output based on the inputs from steering reaction performance system 194, and based on other inputs as well. For instance, interface output system 218 can generate an output indicative of whether the TOA is acceptable and indicative of whether the current error of work machine 100 relative to guidance line 167 is acceptable, whether the heading error of work machine 100 is acceptable, or other information. Generating the control signal considering not only the TOA, but other criteria is indicated by block 308. Generating a control signal can be performed in other ways as well, as indicated by block 310.

Control signal generator 198 then provides the control signal to a controllable subsystem 170 or elsewhere to perform a control operation, as indicated by block 312. The control signal can be fed back to automatic tracking system 164 to control the automatic tracking system (e.g., to tune settings or commands or parameters in system 164) as indicated by block 314. The control signal can be provided to propulsion subsystem 230 to control the propulsion subsystem (e.g., to speed up or slow down work machine 100 based upon the control signal), as indicated by block 316. The control signal can be provided to operator interface system 232 to generate a display element indicative of the steering reaction performance of steering subsystem 224 and indicative of other performance criteria as indicated by block 318 in the flow diagram of FIG. 4. The control signal can be provided to operator interface system 232 to generate a notification or alert, as indicated by block 320. The control signal can be provided to communication system 158 to communicate the performance data to other systems 152 or other machines 154, as indicated by block 322. The control signal can also be output to data store 160 to store the information, or the control signal can be provided to other systems to control those systems in other ways, as indicated by block 324. Data store interaction system 220 can also control data store 160 to store and/or update the performance data, as indicated by block 326. Until the operation is complete, as determined by block 328, processing reverts to block 266 where the next commanded steering value is detected.

Figure 5A:
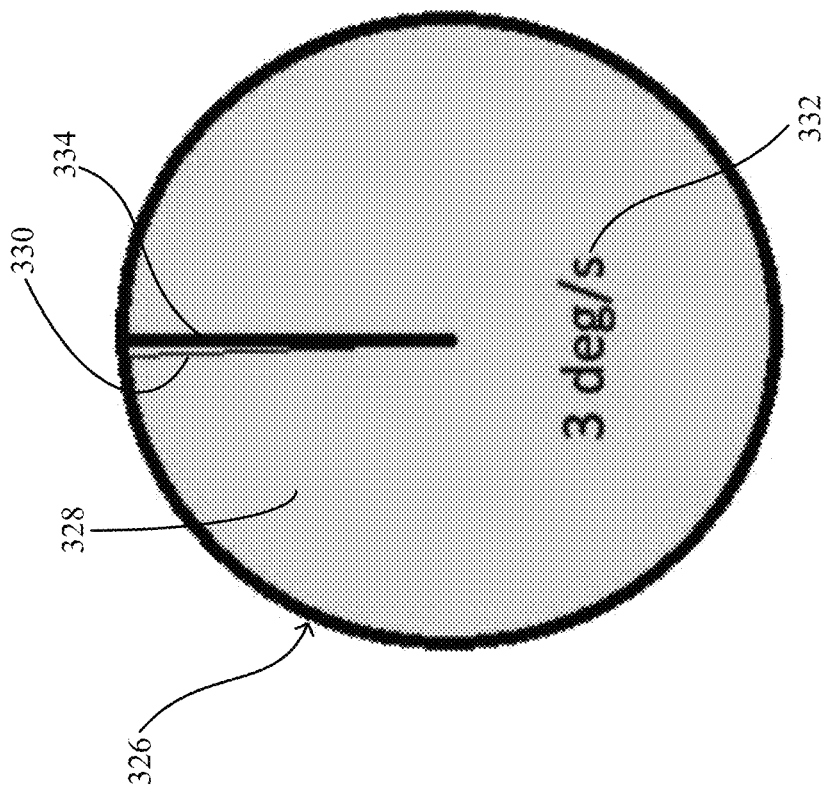
FIGS. 5A, 5B, and 5C show examples of user interface display elements illustrating steering reaction performance.
Figure 5B:
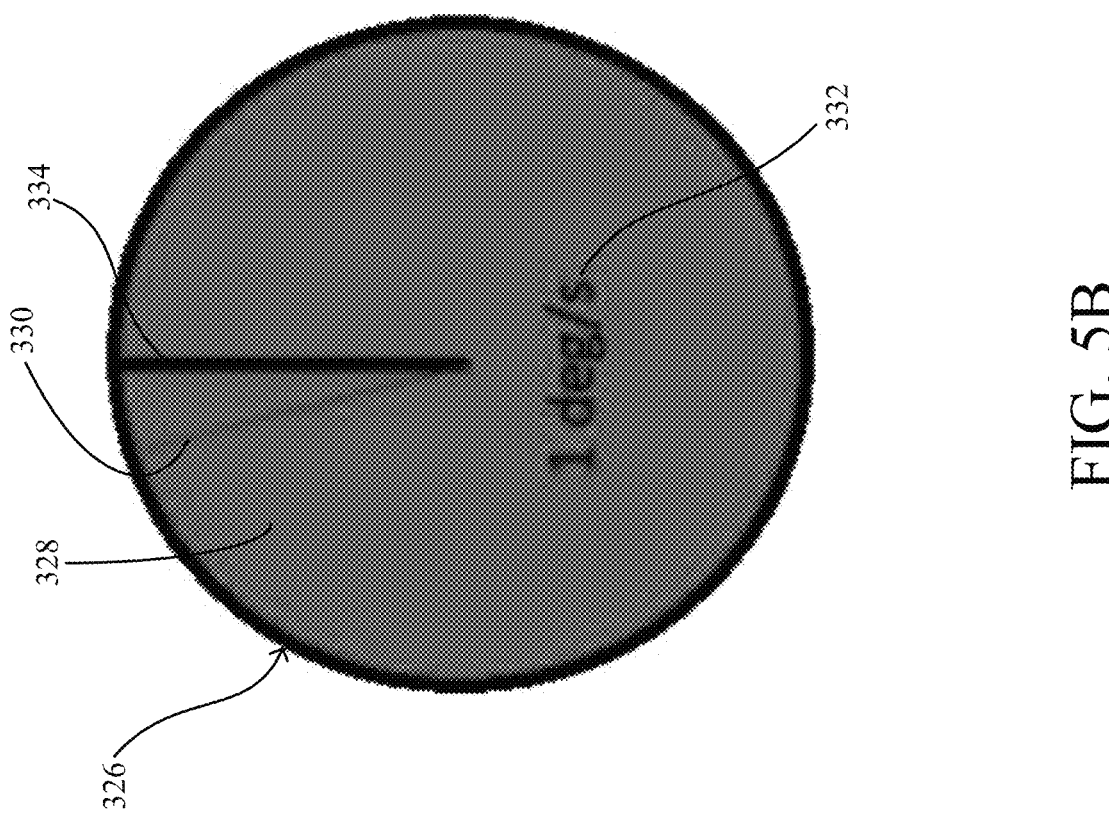
Figure 5C:
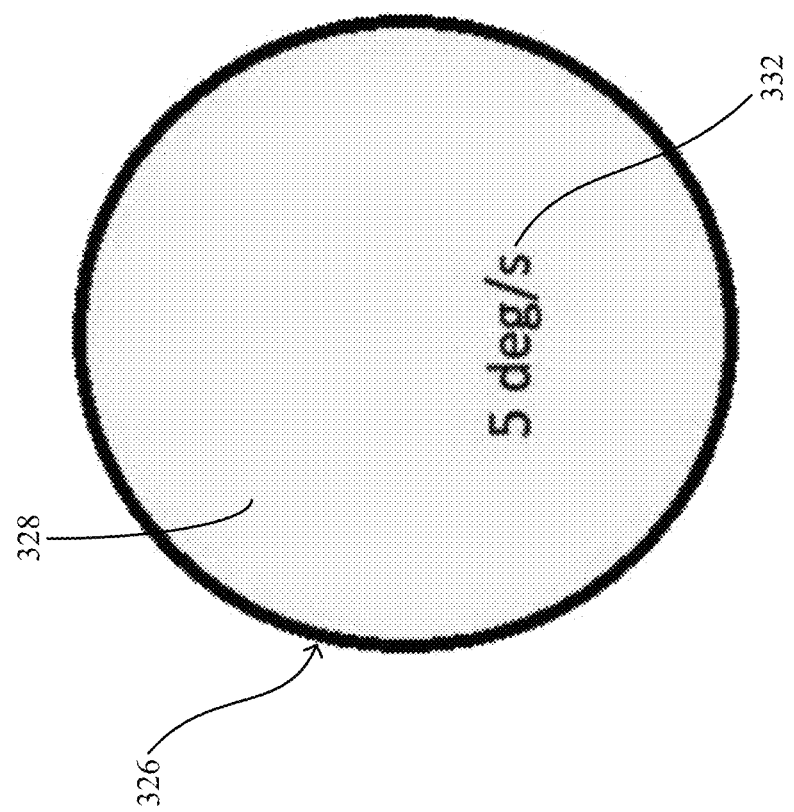

FIGS. 5A-5C show examples of a user interface display element that can be generated based upon the steering reaction performance data. For instance, it may be that the steering reaction performance is only analyzed when the difference between the current steering angle and the commanded steering angle is less than 5 degrees. Further, the performance may be acceptable when the reaction is between 2 degrees per second and 4 degrees per second, inclusive. In that case, FIG. 5A shows one example of a user interface display element 326 that can be used to display not only the steering reaction performance, but also to indicate whether that performance is acceptable. Display element 326 includes a circular area with an internally colored portion 328 and a needle or gauge 330, as well as an alphanumeric value 332. The needle or gauge 330 moves from a pre-defined starting or reference position 334 based upon how quickly (in degrees per second) the work machine 100 is reacting to new steering angle commands. In FIG. 5A, the internal shaded portion 328 can be shaded with a color that indicates whether the steering reaction is acceptable. Thus, in FIG. 5A, the needle 330 is offset from the reference position 334 by 3 degrees, and the alphanumeric portion 332 indicates that the current steering reaction performance is 3 degrees per second. The shaded portion 328 may be shaded green to indicated that the steering reaction performance is acceptable.

FIG. 5B shows that the steering reaction performance has now degraded to 1 degree per second and the shaded portion 328 may be shaded red or another color to indicate that the steering reaction performance is unacceptable.

FIG. 5C shows an example of user interface display element where the difference between the commanded steering angle and the current steering angle exceeds the command threshold value 174 so that the steering reaction performance is not being detected. In that case, the shaded portion 328 may simply be unshaded and the alphanumeric portion 332 indicates the degrees per second (e.g., 5 degrees per second). The absence of display elements 330 and 334 indicate that the steering reaction performance is not being detected or analyzed.

Figure 6A:
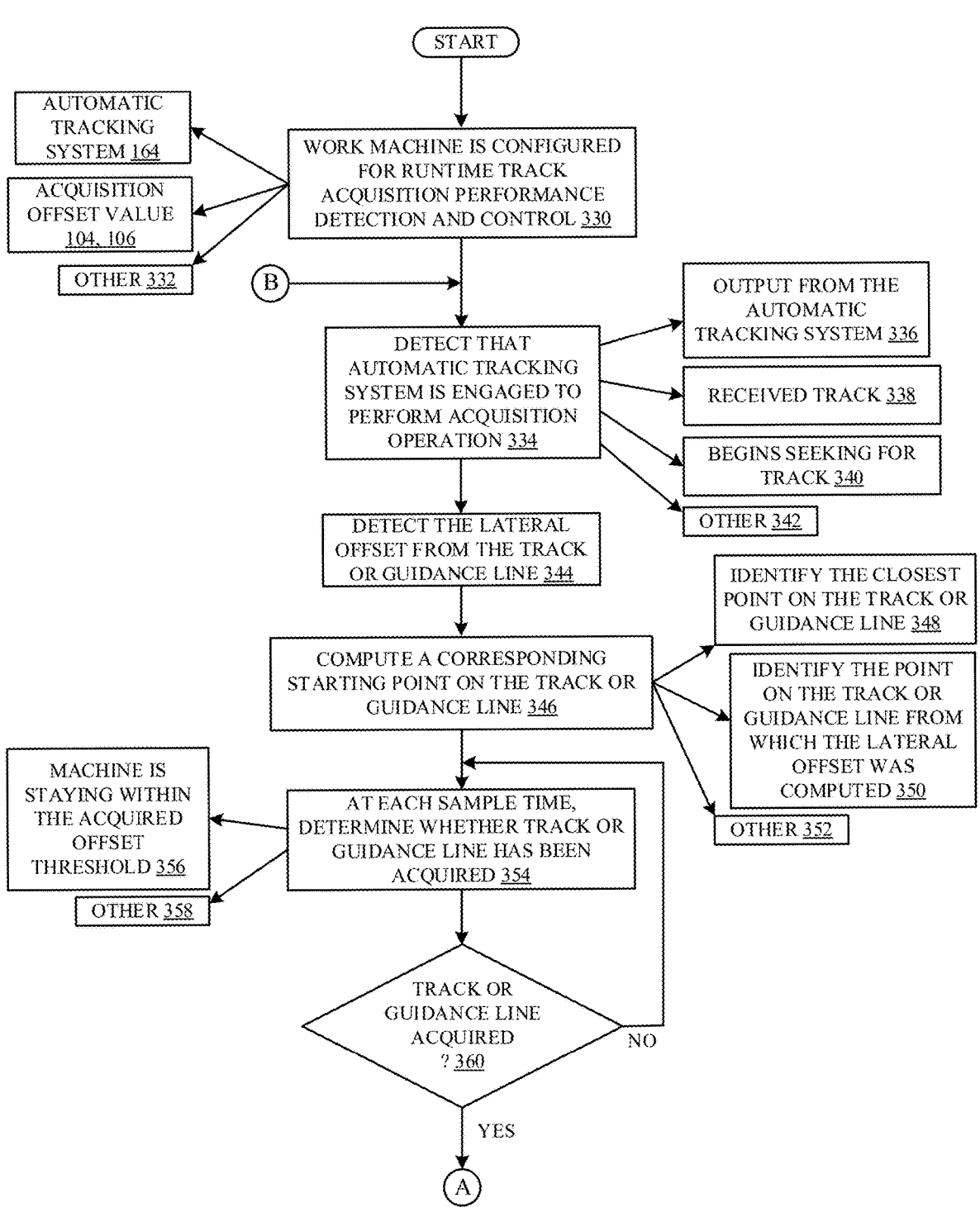
FIGS. 6A and 6B show a flow diagram illustrating one example of the operation of an auto tracking performance system in detecting track acquisition performance.
Figure 6B:
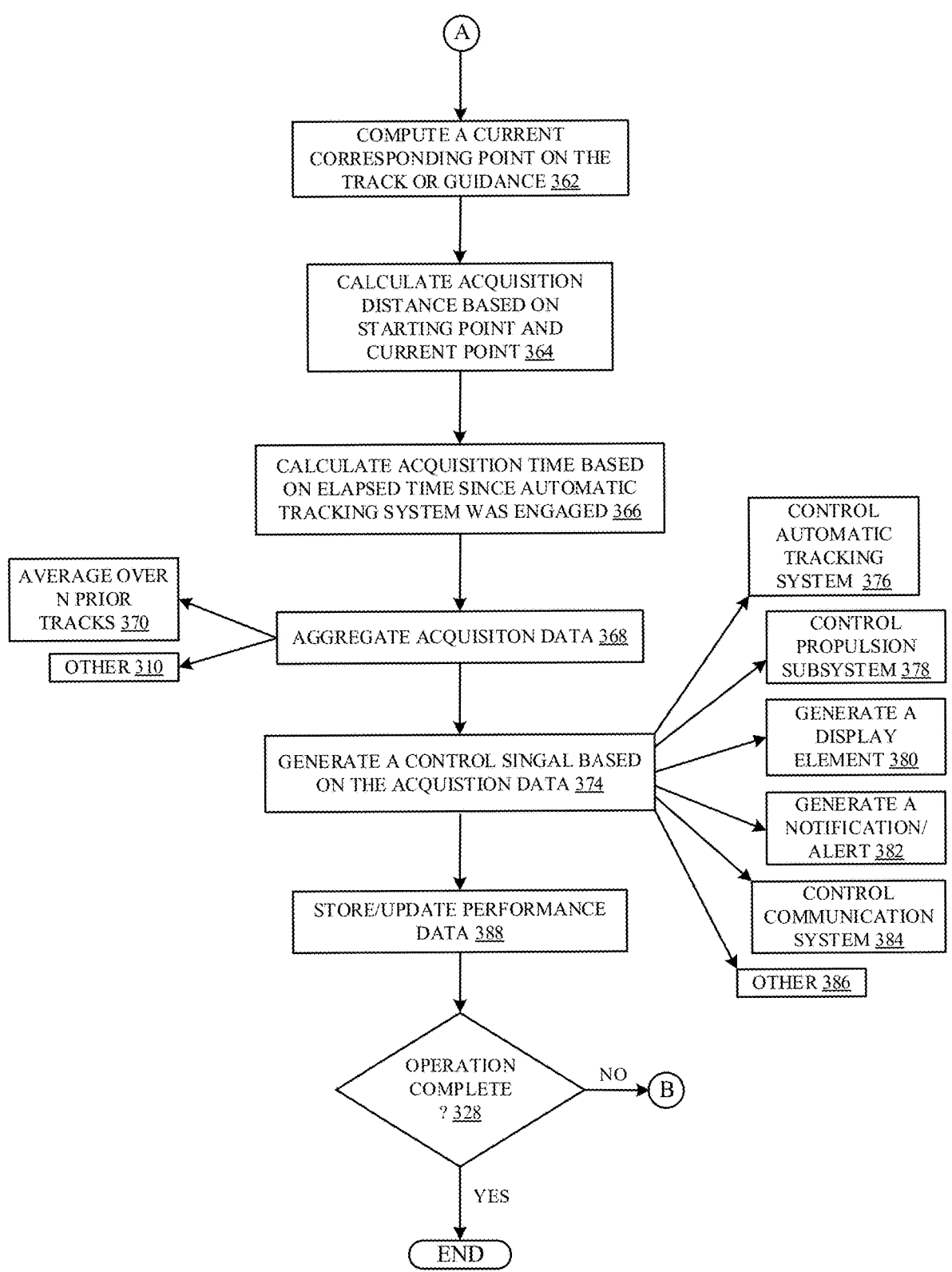

FIGS. 6A and 6B (collectively referred to herein as FIG. 6) show a flow diagram illustrating one example of the operation of track acquisition performance detection system 196. It is first assumed that work machine 100 is configured for runtime track acquisition performance detection and control, as indicated by block 330 in the flow diagram of FIG. 6.

Thus, work machine 100 can include automatic tracking system 164, and can access acquisition lateral offset values 104 and 106 that can be used to determine when work machine 100 has acquired the guidance line 167 that it is supposed to be following. Work machine 100 can be configured in other ways to detect runtime track acquisition performance as well, as indicated by block 332.

In order to detect the track acquisition performance, acquisition distance/time processor 212 first receives the engaged/disengaged signal 249 from automatic tracking system 164 indicating that the automatic tracking system is engaged (it has identified the guidance line 167 that it is supposed to follow and has begun seeking to follow that guidance line). Detecting that the automatic tracking system 164 is engaged is indicated by block 334 in the flow diagram of FIG. 6. Detecting that automatic tracking system 164 is engaged can be performed by receiving the output 249 from automatic tracking system 164, as indicated by block 336. The output indicates that automatic tracking system 164 has identified the guidance line 167 or track that it is supposed to follow is indicated by block 338. The engaged signal indicates that automatic tracking system 164 has begun controlling controllable subsystems 170 to seek for and follow the identified track or guidance line, as indicated by block 340. Detecting that the automatic tracking system 164 is engaged can be done in other ways as well, as indicated by block 342.

When acquisition distance/time processor 212 detects that automatic tracking system 164 is engaged, then processor 212 detects the current position of work machine 100 from position sensor 182 and calculates the lateral offset from the track or guidance line 167, as indicated by block 334. Based upon the current position of work machine 100 and the lateral offset from the track or guidance line, track acquisition distance/time processor 212 computes a corresponding starting point on the track or guidance line 167 (such as starting point 130 described above with respect to FIGS. 2A-2C). Computing the corresponding starting point is indicated by block 346 in the flow diagram of FIG. 6. In one example, the starting point 130 is computed as the closest point on the track or guidance line 167 that is closest to work machine 100, as indicated by block 348 in the flow diagram of FIG. 6. In another example, the starting point is the point on the track or guidance line from which the lateral offset was computed, as indicated by block 350. Thus, regardless of whether the guidance line 167 is straight or curved, the starting point 130 is identified. The starting point for track acquisition can be identified in the other ways as well, as indicated by block 352.

Then, at each sample time, acquisition distance/time processor 212 determines whether the track or guidance line has been acquired by automatic tracking system 164, as indicated by block 354 in the flow diagram of FIG. 6. In one example, the track or guidance line is acquired when work machine 100 performs a turn to follow guidance line 167 while work machine 100 is staying within the offset thresholds 104 and 106 as it is following the guidance line, as indicated by block 356 in the flow diagram of FIG. 6. Determining whether the track or guidance line 167 has been acquired can be done in other ways as well, as indicated by block 358. Until the track or guidance line 167 is acquired, as determined at block 360, processing reverts to block 354 where automatic tracking system 354 continues to control the controllable subsystems 170 to acquire the track or guidance line 167.

Once the track or guidance line 167 is acquired, the acquisition distance/time processor 212 computes a current point on the track or guidance line 167 corresponding to the current location of work machine 100 as indicated by block 362 in the flow diagram of FIG. 6. For instance, the corresponding point is identified as points 132, 140, and 144 in FIGS. 2A, 2B, and 2C, respectively. Acquisition distance/time processor 212 then calculates the acquisition distance between the starting point and the current point, as indicated by block 364 in the flow diagram of FIG. 6. Acquisition distance/time processor 212 can also or instead calculate the acquisition time based upon the elapsed time between when automatic tracking system 164 was engaged and the time when the tracking or guidance line has been acquired. Calculating the acquisition time is indicated by block 366 in the flow diagram of FIG. 6.

Acquisition aggregator 214 then aggregates the acquisition data (e.g., the acquisition distance and/or the acquisition time) with previous acquisition data, as indicated by block 368. For instance, acquisition aggregator 214 can store the current acquisition data and generate aggregated track acquisition data 178 as the average of the acquisition data over the prior N acquisition operations or the acquisition data corresponding to the prior N tracks or guidance lines, as indicated by block 370. The acquisition aggregator 214 can aggregate the acquisition data in other ways as well, as indicated by block 372.

Control signal generator 198 then generates a control signal based on the acquisition data, as indicated by block 374 in the flow diagram of FIG. 6. The control signal can be applied to control automatic tracking system 164, as indicated by block 376 and/or to control the propulsion system 230 to change the speed of work machine 100, as indicated by block 378. The control signal can be generated by interface output system 218 to control operator interface subsystem 232 to generate a display element based upon the track acquisition performance data, as indicated by block 380 in the flow diagram of FIG. 6. A control signal can be used to control a notification or alert for operator 148, as indicated by block 382 or to control communication system 158 to generate communication with other systems 152 or other machines 154 based upon the track acquisition performance data, as indicated by block 384. Any of a wide variety of other control signals can be generated to perform other control operations as well, as indicated by block 386.

Data store interaction system 220 can then generate a control signal to control data store 160 to store and/or update aggregated track acquisition data 178 or other performance data, as indicated by block 388 in the flow diagram of FIG. 6.

Until operation is complete, as determined at block 390 in the flow diagram of FIG. 6, processing reverts to block 334 where the system waits until track acquisition performance detection system 196 receives an input indicating that automatic tracking system 164 is engaged to perform another track acquisition operation.

Figure 7:
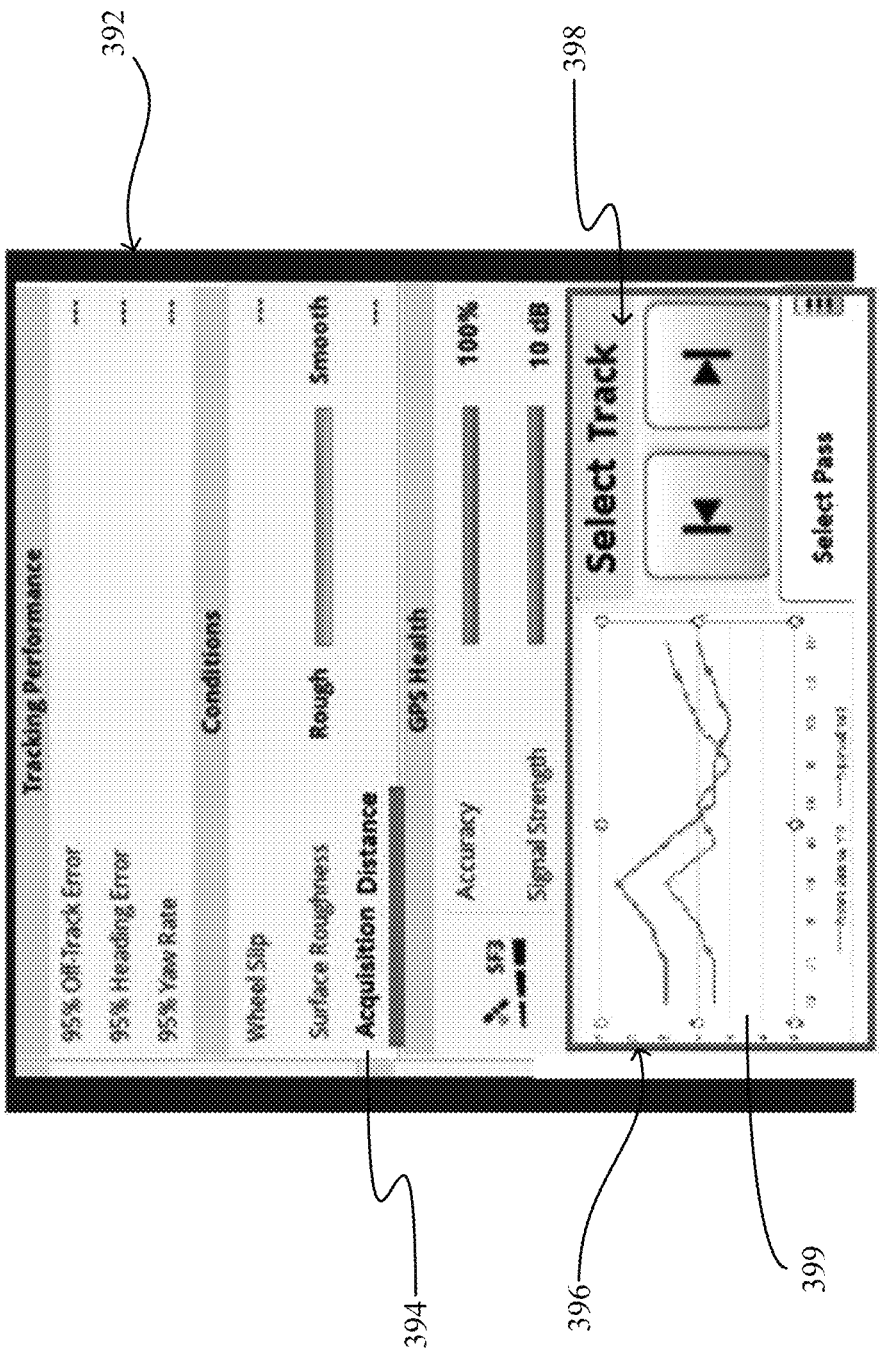
FIG. 7 shows one example of an operator interface display element illustrating track acquisition performance.

FIG. 7 shows one example of a user interface display element 392 that displays various information corresponding to the performance of automatic tracking system 164 and/or the controllable subsystems 170 on work machine 100. Display element 392 includes sections that show values corresponding to off track error, heading error, and yaw rate as well as information corresponding to wheel slip and surface roughness conditions. In addition, display element 392 includes an acquisition distance display element 394 that can display a value identifying the acquisition distance for a specific track or the aggregated acquisition distance for a plurality of tracks. In another example, the acquisition display element 394 can be switched or augmented to show acquisition time as well. Display element 392 may also include information corresponding to whether position sensor 182 is functioning properly, has satellite reception, etc.

Further, in the example shown in FIG. 7, display element 392 includes an individual track display portion 396. Track display portion 396 includes a set of track selection actuators 398 that can be used to select a track or pass that work machine 100 has completed. When the track or pass is selected, then graphical display portion 399 graphically displays track acquisition data for the selected track. The track acquisition data may graph the lateral offset relative to the position of work machine 100 along the track, or other information. FIG. 7 is just one example of an operator display element that can be generated based upon the track acquisition performance data, and a wide variety of other display elements can be generated as well.

It can thus be seen that the present description describes a system that detects steering reaction performance of a work machine and generates control signals based upon the detected performance. Similarly, the present description describes a system that detects track acquisition performance of the automatic tracking system 164 on the work machine and generates control signals based upon that performance as well.

The present discussion has mentioned processors and servers. In one example, the processors and servers include computer processors with associated memory and timing circuitry, not separately shown. The processors or servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays the mechanisms has speech recognition components, the mechanisms can be actuated using speech commands.

A number of data stores have also been discussed. It will be noted the data stores can each be broken into multiple data stores. All can be local to the systems accessing the data stores, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generators, aggregators, detectors, and/or logic. It will be appreciated that such systems, components, generators, aggregators, detectors, and/or logic can be comprised of hardware items (such as processors and associated memory, or other processing components, some of which are described below) that perform the functions associated with those systems, components, generators, aggregators, detectors, and/or logic. In addition, the systems, components, generators, aggregators, detectors, and/or logic can be comprised of software that is loaded into a memory and is subsequently executed by a processor or server, or other computing component, as described below. The systems, components, generators, aggregators, detectors, and/or logic can also be comprised of different combinations of hardware, software, firmware, etc., some examples of which are described below. These are only some examples of different structures that can be used to form the systems, components, generators, aggregators, detectors, and/or logic described above. Other structures can be used as well.

Figure 8:
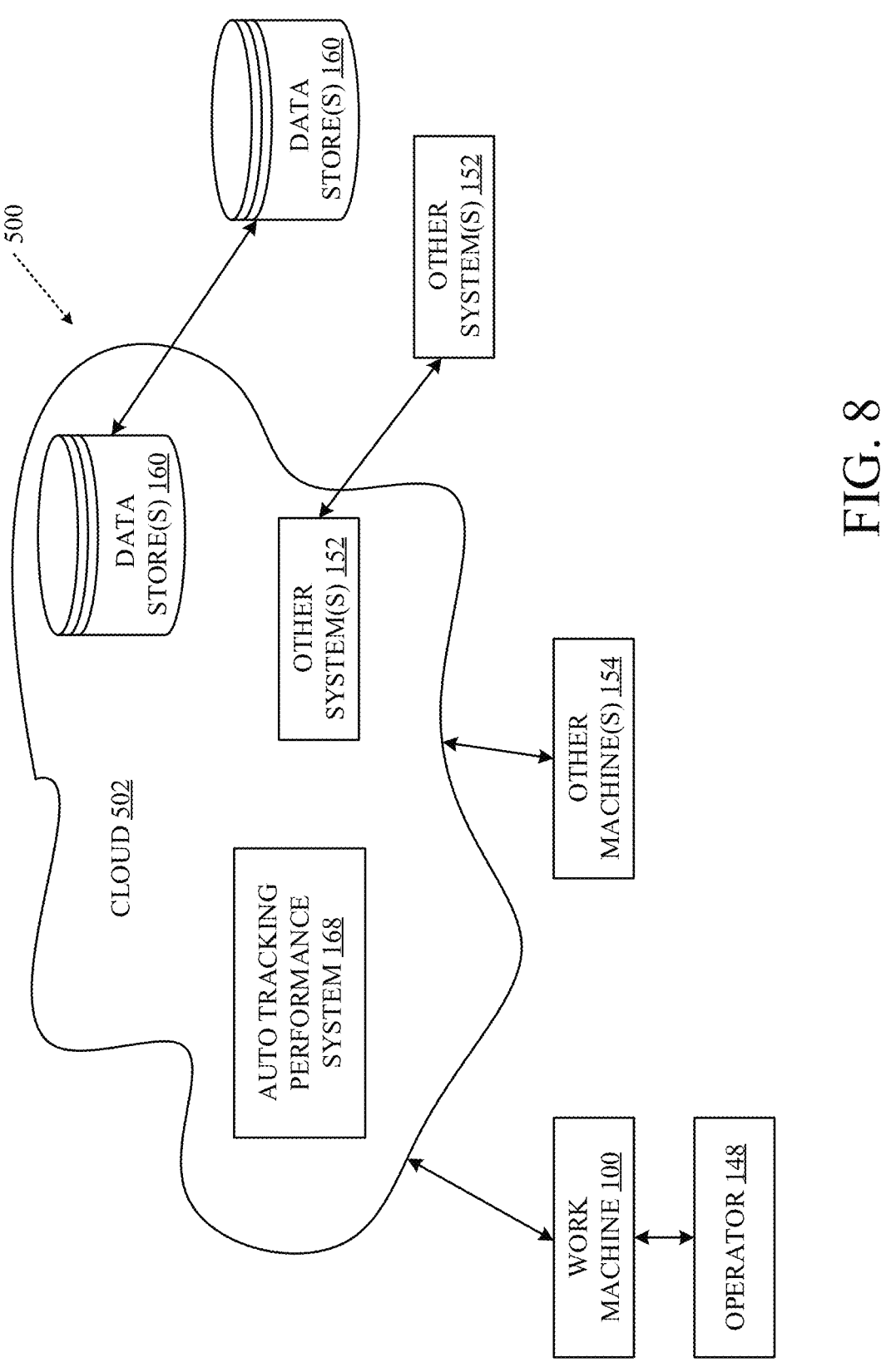
FIG. 8 is a block diagram showing one example of an agricultural system deployed in a remote server environment.

FIG. 8 is a block diagram of work machine 100, shown in FIG. 1, except that machine 100 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 8, some items are similar to those shown in previous FIGS. and they are similarly numbered. FIG. 8 specifically shows that part or all of auto tracking performance system 168, other systems 152, and data store 160 can be located at a remote server location 502. Therefore, work machine 100 accesses those systems through remote server location 502.

FIG. 8 also depicts another example of a remote server architecture. FIG. 8 shows that it is also contemplated that some elements of previous FIGS are disposed at remote server location 502 while others are not. By way of example, data sore 160 or other systems 152 can be disposed at a location separate from location 502, and accessed through the remote server at location 502. Regardless of where the items are located, they can be accessed directly by work machine 100, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
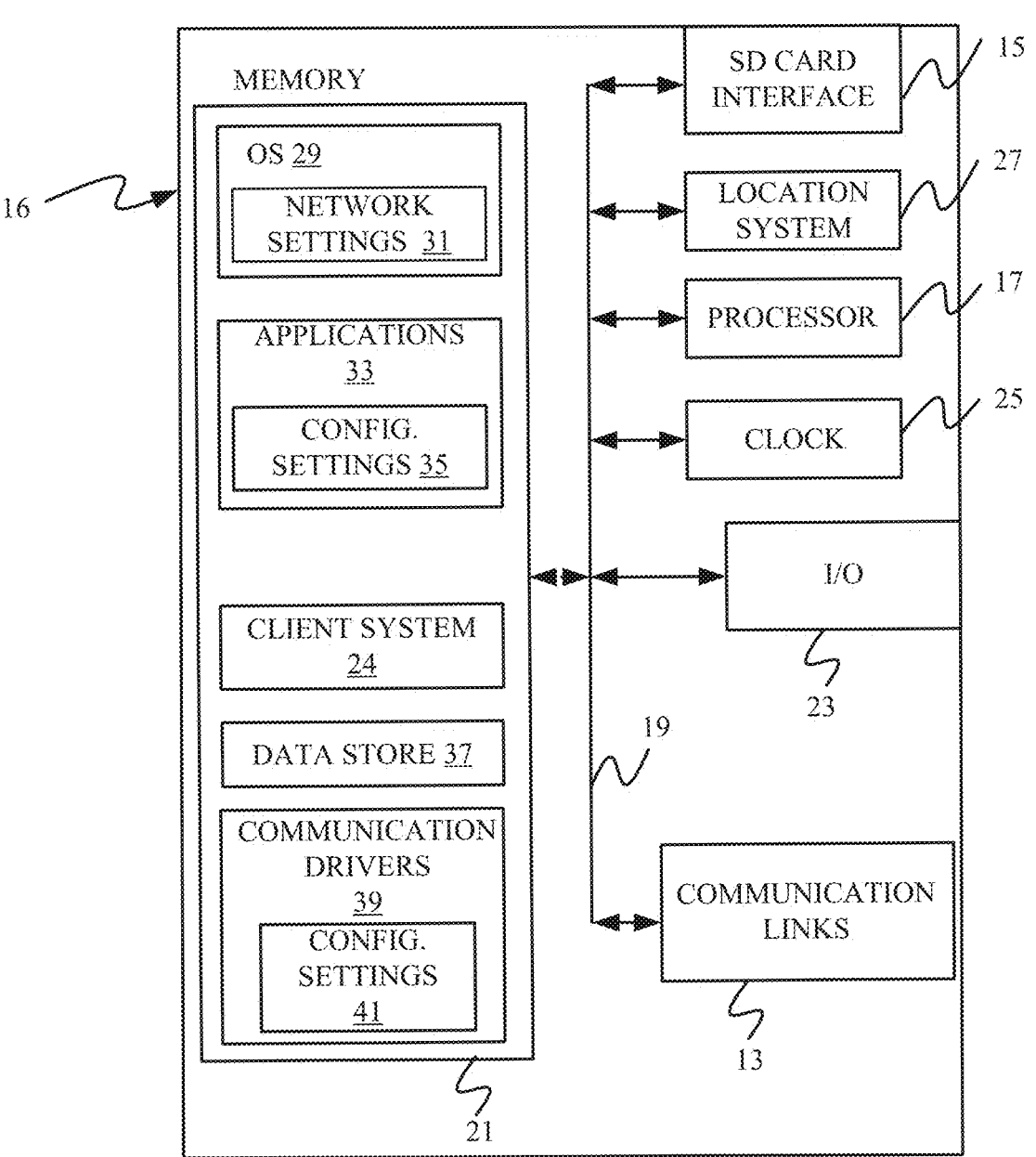
FIGS. 9, 10, and 11 show examples of mobile devices that can be used in systems illustrated in other figures.
Figure 10:
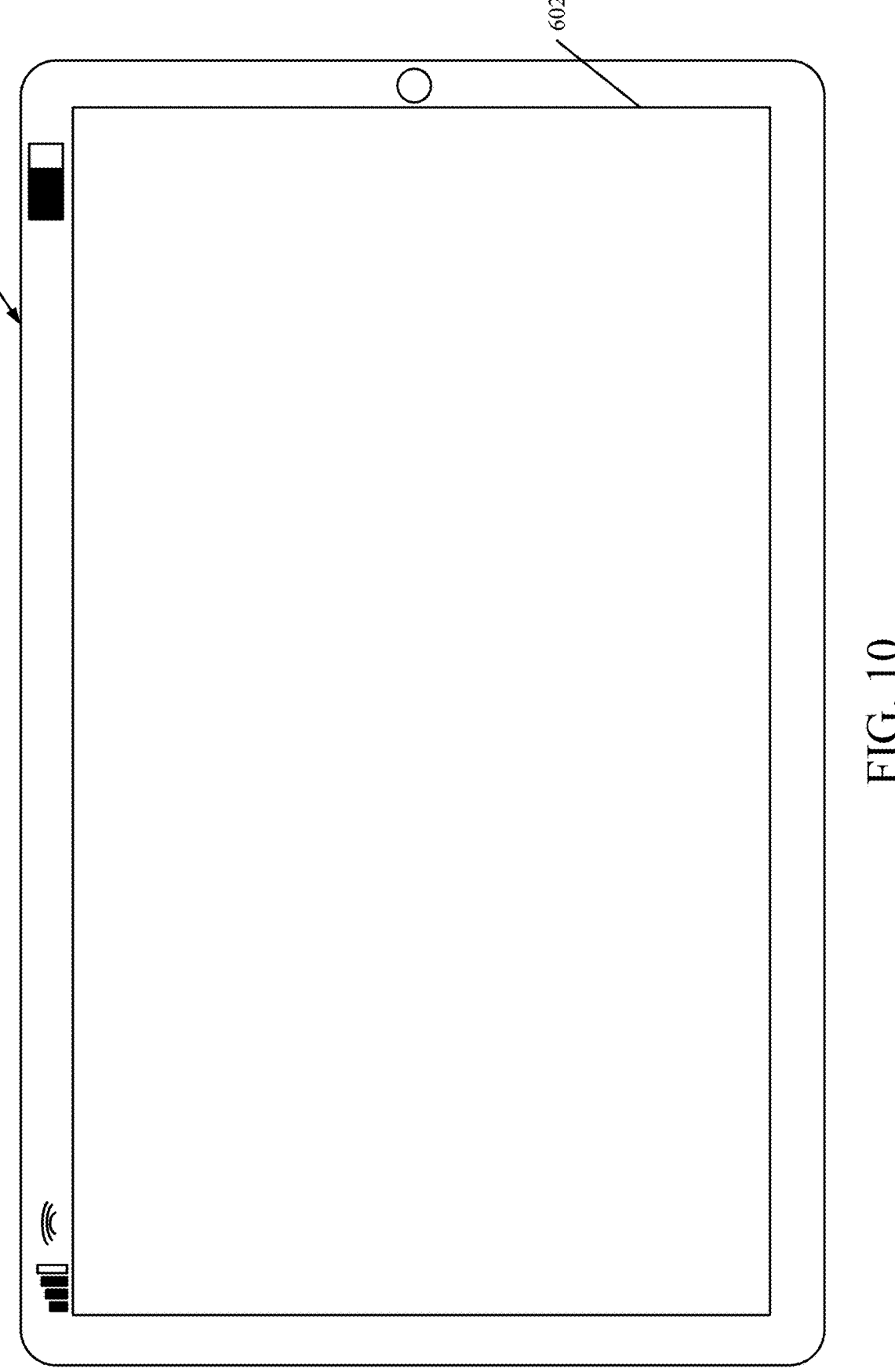
Figure 11:
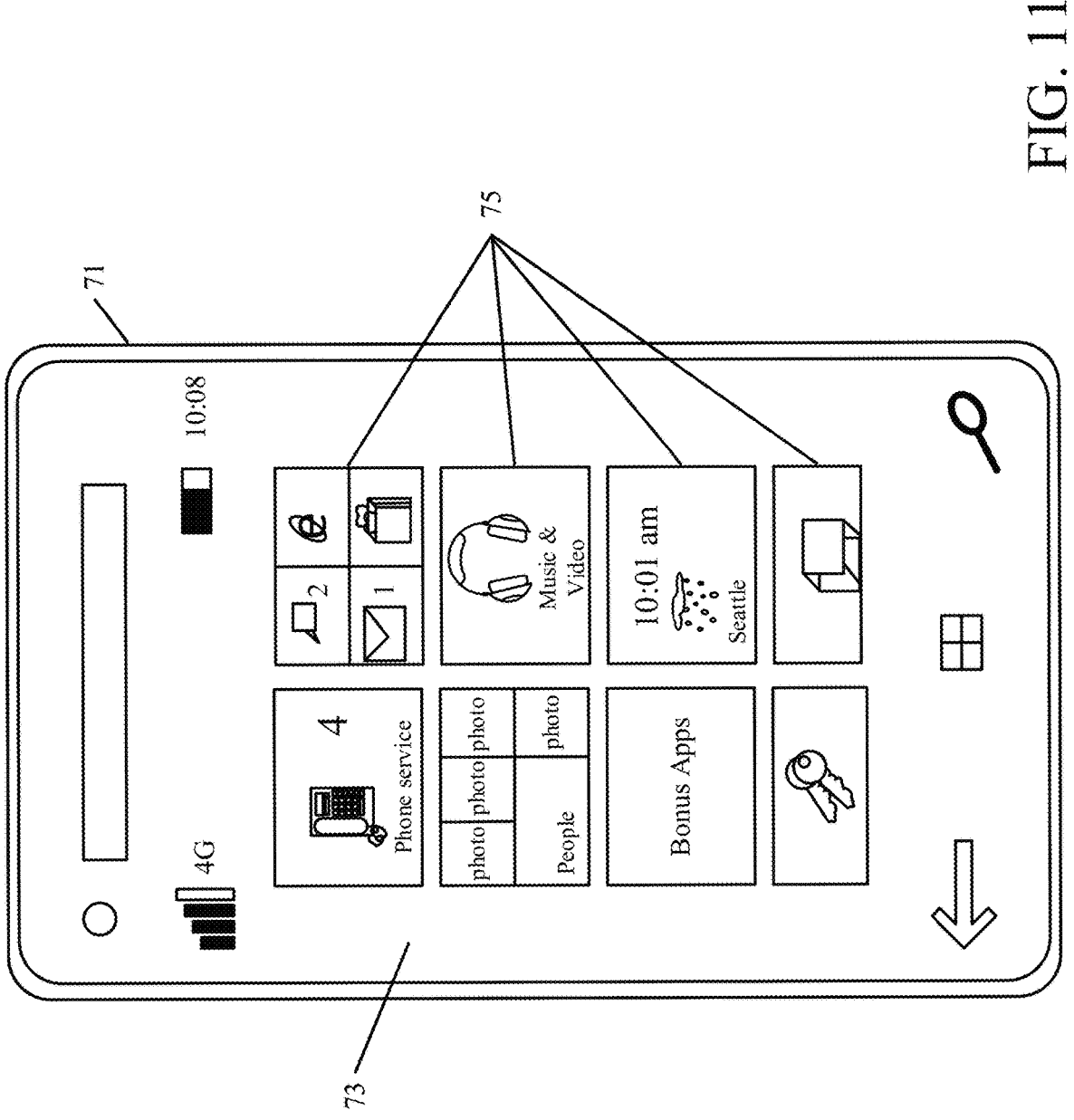

FIG. 9 is a simplified block diagram of one illustrative example of a handheld or mobile computing device that can be used as a user's or client's hand held device 16, in which the present system (or parts of it) can be deployed. For instance, a mobile device can be deployed in the operator compartment of work machine 100 for use in generating, processing, or displaying the performance data. FIGS. 10-11 are examples of handheld or mobile devices.

FIG. 9 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
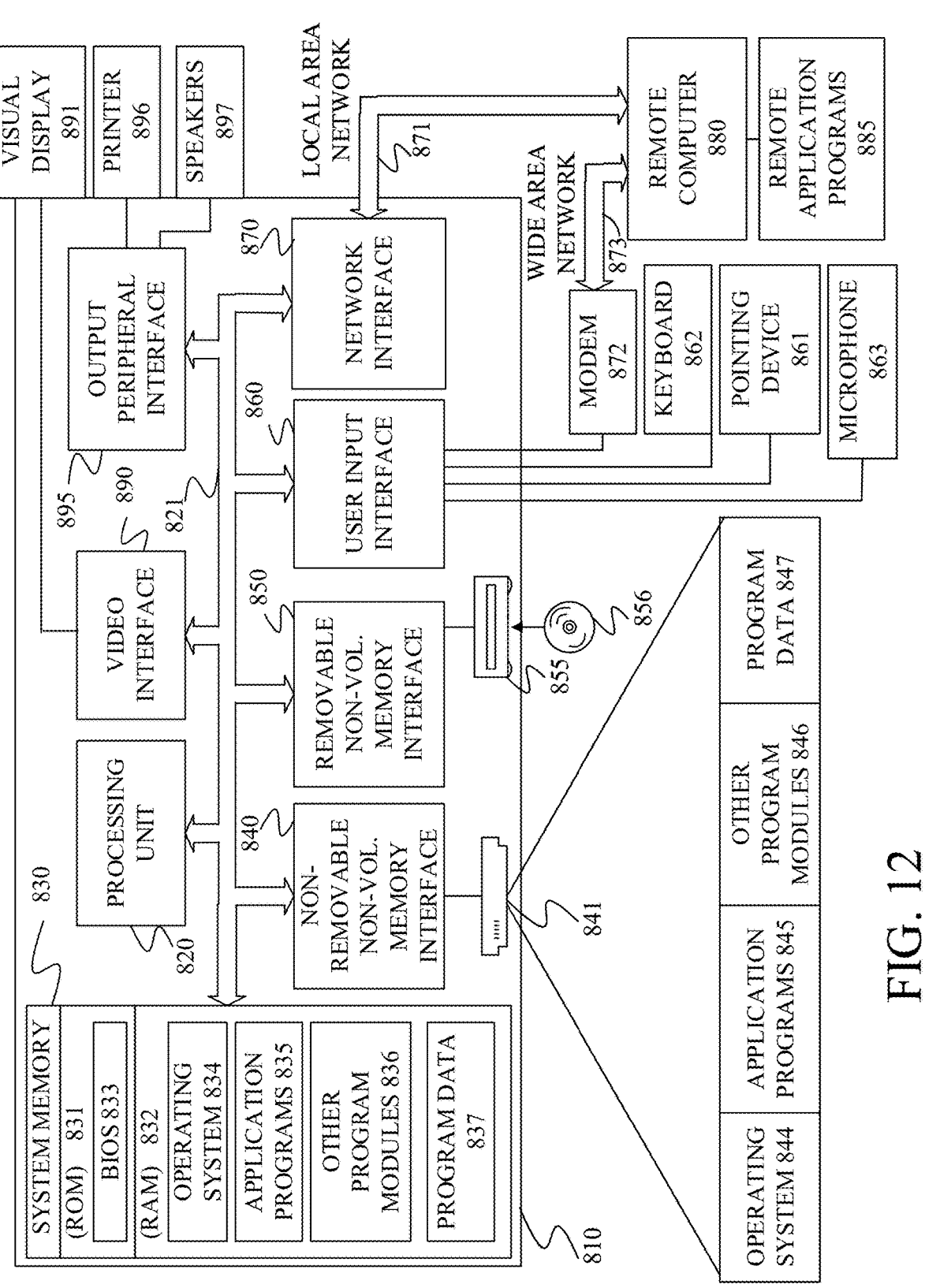
FIG. 12 is a block diagram showing one example of a computing environment that can be used in architectures and systems shown in other figures.

FIG. 12 is one example of a computing environment in which elements of previous FIGS., or parts of it, (for example) can be deployed. With reference to FIG. 12, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
   receiving a commanded steering value indicative of a steering command for a guidance line through a work site from an automatic tracking system on a work machine;
   detecting, during runtime based on a time-to-achieve the commanded steering value, a performance characteristic indicative of responsiveness of the automatic tracking system in following the guidance line through the work site; and
   generating, during runtime, a control signal based on the performance characteristic.

2. The computer implemented method of claim 1 wherein detecting the performance characteristic comprises:
   detecting a first steering value indicative of a steering angle on a work machine at a first sample time;
   detecting a second steering value indicative of a steering angle on the work machine at a second sample time; and
   computing a steering angle rate-of-change (ROC) value based on the first steering value, the second steering value, and a time between the first and second sample times.

3. The computer implemented method of claim 1 wherein detecting the performance characteristic comprises:
   detecting an acquisition value indicative of a distance that the work machine travels between the automatic tracking system beginning to control the work machine to follow the guidance line and the automatic tracking system controlling the work machine to follow the guidance line within a threshold lateral offset from the guidance line.

4. The computer implemented method of claim 2 wherein generating the control signal comprises:

generating an interface system control signal to control an operator interface system to generate a display element based on the steering angle ROC.

5. The computer implemented method of claim 2 wherein detecting the performance characteristic comprises:

computing the time-to-achieve the commanded steering value based on the steering angle ROC.

6. The computer implemented method of claim 5 wherein computing the steering angle ROC comprises:

aggregating a plurality of steering angle ROC values to obtain an aggregated steering angle ROC value, wherein computing the time-to-achieve the commanded steering value comprises computing the time-to-achieve the commanded steering value based on the aggregated steering angle ROC.

7. The computer implemented method of claim 2 wherein detecting the first steering value comprises:

detecting an angle of a steerable wheel relative to a reference point on the work machine.

8. The computer implemented method of claim 2 wherein detecting the first steering value comprises:

detecting an actuator position of a steering actuator that drives steering of a steerable ground engaging element of the work machine.

9. The computer implemented method of claim 3 wherein generating the control signal comprises:

generating the control signal to display an operator interface display element based on the distance.

10. The computer implemented method of claim 3 wherein detecting the acquisition value comprises:

aggregating a plurality of acquisition values corresponding to a plurality of different guidance lines to obtain an aggregated acquisition value, wherein generating the control signal comprises generating the control signal based on the aggregated acquisition value.

11. A computer implemented method, comprising:

performing runtime rate-of-change (ROC) detection detecting a steering angle ROC value indicative of a rate-of-change of a steering angle of a work machine in response to a steering command signal during runtime; and generating a ROC runtime control signal based on the steering angle ROC value.

12. The computer implemented method of claim 11 and further comprising:

performing runtime track acquisition detection detecting a track acquisition value indicative of performance of the work machine in automatically acquiring a guidance line; and generating a track acquisition runtime control signal based on the detected track acquisition value.

13. The computer implemented method of claim 11 and further comprising:

receiving the steering command signal from an automatic tracking system on the work machine.

14. The computer implemented method of claim 11 wherein performing runtime ROC detection comprises:

detecting a first steering value indicative of a steering angle on the work machine at a first sample time;

detecting a second steering value indicative of a steering angle on the work machine at a second sample time; and computing the steering angle ROC value based on the first steering value, the second steering value, and a time between the first and second sample times.

15. The computer implemented method of claim 11 and further comprising:

receiving a commanded steering value indicative of a steering command from an automatic tracking system on the work machine; and computing a time-to-achieve the commanded steering value based on the steering angle ROC value.

16. The computer implemented method of claim 12 wherein detecting a track acquisition value comprises:

receiving a target guidance line from an automatic tracking system on the work machine; and detecting a distance that the work machine travels between when the automatic tracking system begins to control the work machine to follow the target guidance line and when the automatic tracking system controls the work machine to follow the target guidance line within a threshold lateral offset from the target guidance line.

17. The computer implemented method of claim 11 wherein generating a control signal comprises:

generating an interface system control signal to control an operator interface system to generate a display element based on the steering angle ROC.

18. A computer implemented method, comprising:

receiving a target guidance line;

performing runtime track acquisition detection detecting a track acquisition value indicative of performance of a work machine guidance system in automatically acquiring the target guidance line, wherein the track acquisition value represents at least one of an acquisition time or an acquisition distance that a work machine travels between the work machine guidance system beginning to control the work machine to follow the target guidance line, and the work machine guidance system controlling the work machine to follow the target guidance line within a threshold lateral offset from the target guidance line; and generating a track acquisition runtime control signal based on the detected track acquisition value.

19. The computer implemented method of claim 18 wherein generating the track acquisition runtime control signal comprises:

controlling a user interface system based on the track acquisition value.

20. The computer implemented method of claim 18 and further comprising:

performing runtime rate-of-change (ROC) detection detecting a steering angle ROC value indicative of a rate-of-change of a steering angle of the work machine in response to a steering command from the work machine guidance system during runtime; and generating an ROC runtime control signal based on the steering angle ROC value.

\* \* \* \* \*